United States Patent
Strebel et al.

(12)

(10) Patent No.: US 6,321,901 B1
(45) Date of Patent: Nov. 27, 2001

(54) CONVEYOR BELT CLEANER AND TENSIONER

(75) Inventors: Mark Strebel, Chillicothe; Terry Swearingen, Wyanet; Steve Brody, Kewanee, all of IL (US)

(73) Assignee: Martin Engineering Company, Neponset, IL (US)

( * ) Notice: Subject to any disclaimer, the term of this patent is extended or adjusted under 35 U.S.C. 154(b) by 0 days.

(21) Appl. No.: 09/517,406

(22) Filed: Mar. 2, 2000

Related U.S. Application Data

(60) Provisional application No. 60/124,724, filed on Mar. 17, 1999.

(51) Int. Cl.[7] .................................................. B65G 45/00
(52) U.S. Cl. .......................................... 198/499; 15/256.5
(58) Field of Search ..................................... 198/494, 497, 198/499; 15/256.5, 256.51, 256.53

(56) References Cited

U.S. PATENT DOCUMENTS

| | | |
|---|---|---|
| 3,315,764 | 4/1967 | Clarke . |
| 3,994,388 | 11/1976 | Reiter . |
| 4,696,389 | 9/1987 | Schwarze . |
| 4,773,526 | 9/1988 | Slikker . |
| 4,917,231 | 4/1990 | Swinderman . |
| 4,953,689 | 9/1990 | Peterson et al. . |
| 5,197,587 | 3/1993 | Malmberg . |
| 5,222,589 | 6/1993 | Gordon . |
| 5,735,385 | 4/1998 | Bowler et al. . |

FOREIGN PATENT DOCUMENTS

| | | |
|---|---|---|
| 905082 | 11/1986 | (BE) . |
| G 94 16 219.0 | 10/1994 | (DE) . |
| 296 01 854 | 5/1996 | (DE) . |
| 0 338 118 | 10/1989 | (EP) . |
| 0 573 688 | 6/1992 | (EP) . |
| WO 98/08757 | 3/1998 | (WO) . |

Primary Examiner—Kenneth W. Noland
(74) Attorney, Agent, or Firm—Lee, Mann, Smith, McWilliams, Sweeney & Ohlson

(57) ABSTRACT

A conveyor belt cleaner and tensioner assembly including a conveyor belt cleaner and a conveyor belt cleaner tensioner. The conveyor belt cleaner includes a scraper blade assembly having a mounting member and a scraper blade. The mounting member includes a base member adapted to be attached to a cross shaft and first and second flanges extending outwardly from the base member forming a first slot therebetween. The scraper blade includes a mounting base having a bore through which the mounting member extends, second and third slots adapted to receive the first and second flanges of the mounting member, and a third flange adapted to be inserted in the first slot of the mounting member such that the scraper blade is rotatably attached to the mounting member. The tensioner includes a support arm rotatably attached to a rotatable tensioning rod and a pivot arm pivotally attached to the support arm which receives the cross shaft. A biasing member extends between the support arm and the pivot arm. Rotation of the tensioning rod moves the support bracket and pivot arm along the tensioning rod until the scraper blades engage the conveyor belt, whereafter continued rotation of the tensioning rod compresses the biasing member to resiliently bias the scraper blades into engagement with the conveyor belt.

16 Claims, 3 Drawing Sheets

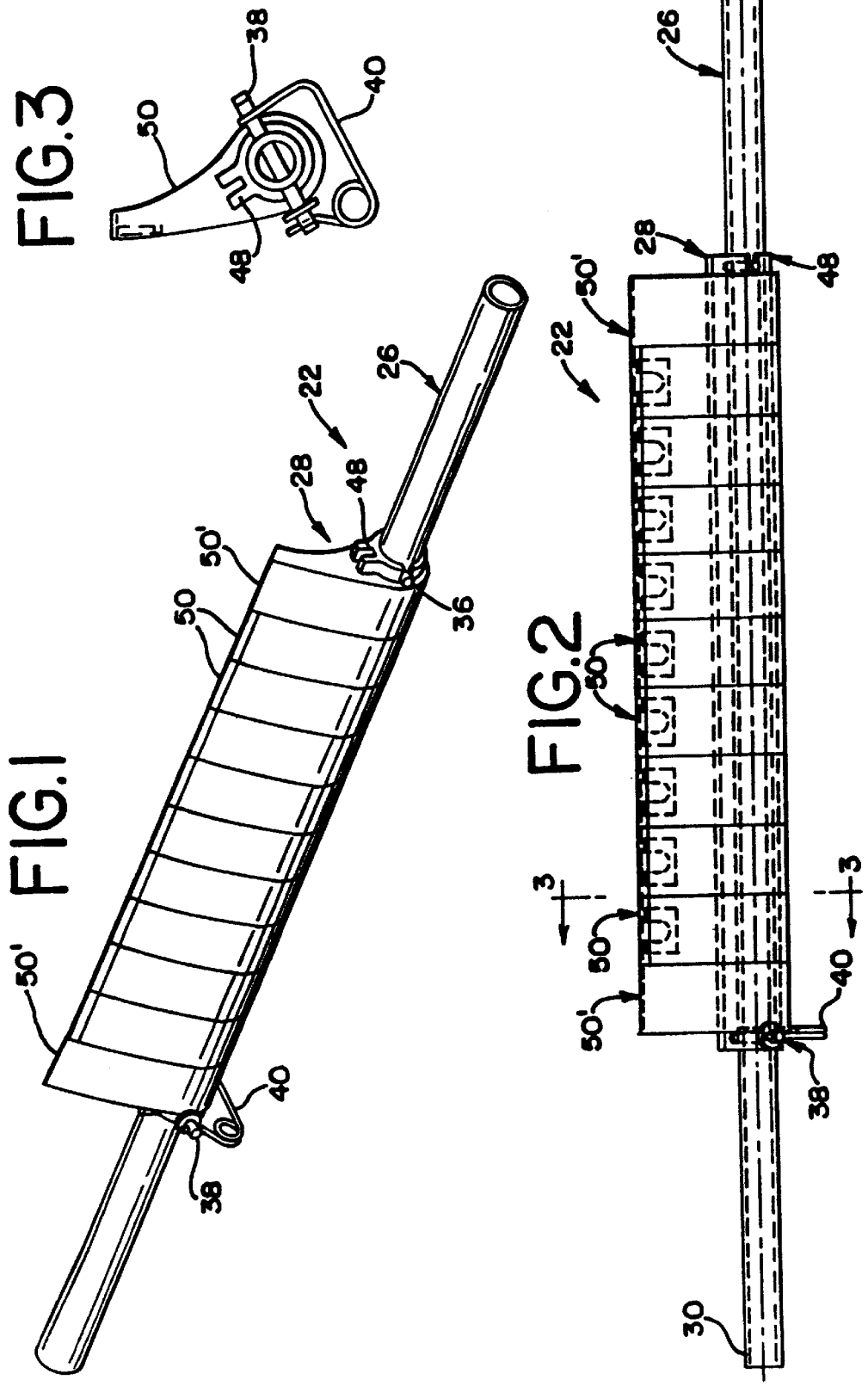

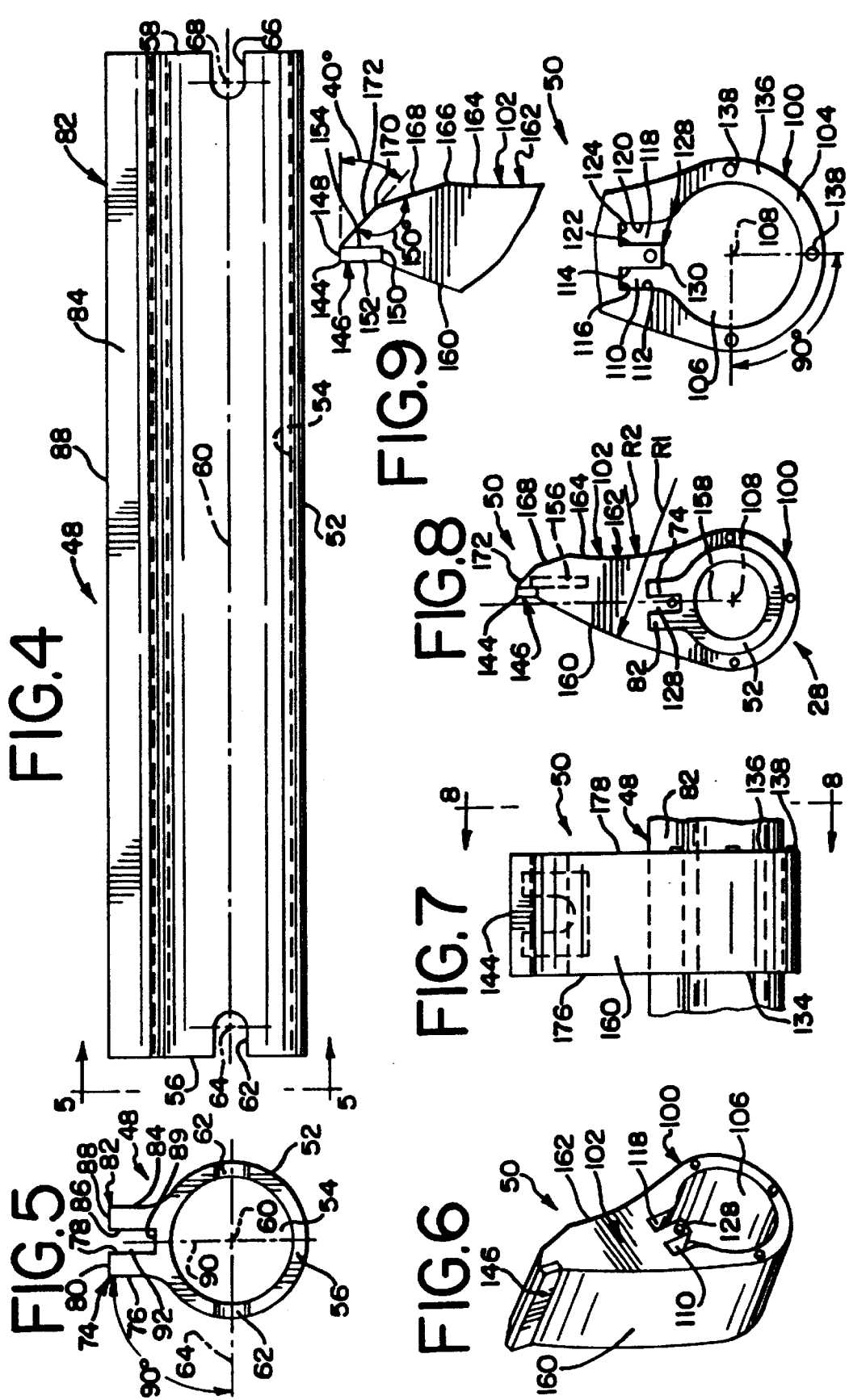

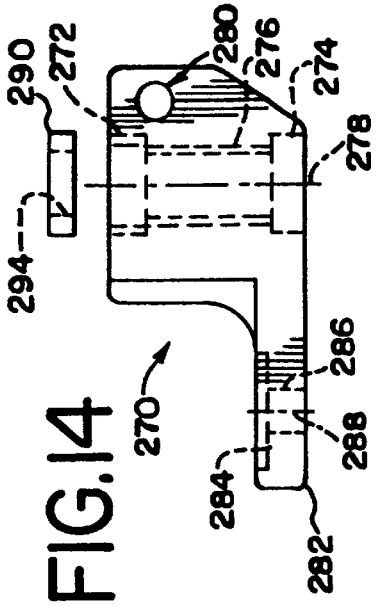
FIG.14
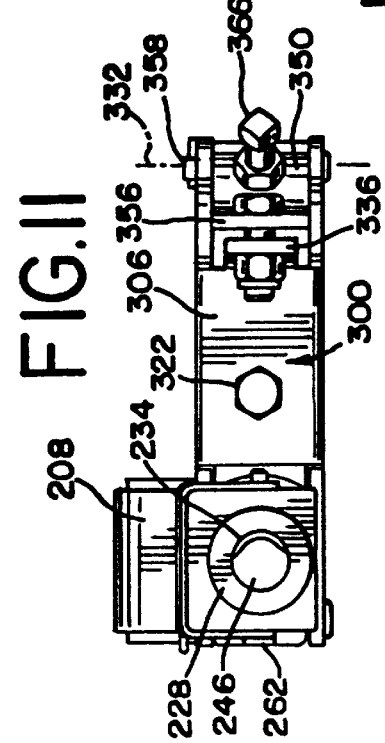
FIG.11
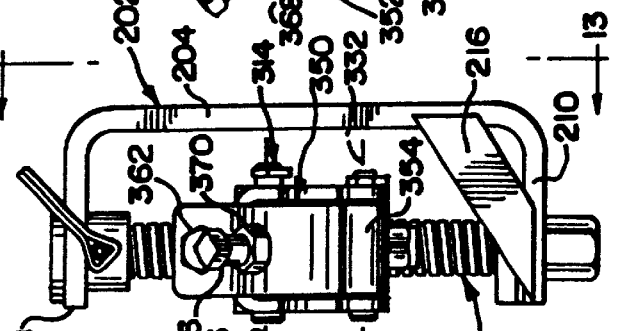
FIG.13
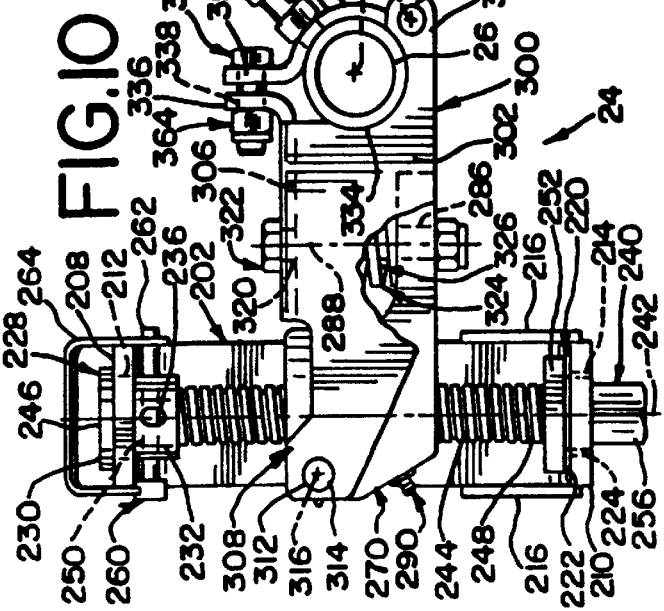
FIG.12
FIG.10

CONVEYOR BELT CLEANER AND TENSIONER

RELATED APPLICATIONS

This application claims the benefit of U.S. Provisional Application No. 60/124,724, filed Mar. 17, 1999.

BACKGROUND OF THE INVENTION

The present invention is directed to a conveyor belt cleaner and tensioner assembly including a conveyor belt cleaner having a plurality of scraper blades adapted to scrape adherent material from a conveyor belt and a conveyor belt cleaner tensioner for resiliently linearly biasing the scraper blades into scraping engagement with the conveyor belt.

Conveyor belt cleaners are used to remove material which adheres to the surface of a conveyor belt after the material has moved past the discharge point of a conveyor. During use the scraper blades of the conveyor belt cleaner wear due to their scraping engagement with the conveyor belt and eventually require replacement. Quick and easy replacement of worn scraper blades is desired to reduce maintenance costs and to reduce conveyor down time. Scraper blades are biased into engagement with the conveyor belt by one or more tensioners such that the scraper blades engage the conveyor belt with a desired amount of force to maximize cleaning efficiency. A linear tensioner maintains the scraper blades at substantially a constant angle with respect to the conveyor belt to maximize cleaning efficiency. However, it is also desirable to allow the scraper blades to rotate away from the conveyor belt when obstructions on the belt, such as mechanical belt splices, are encountered by the scraper blades.

SUMMARY OF THE INVENTION

A conveyor belt cleaner and tensioner assembly including a conveyor belt cleaner and a conveyor belt cleaner tensioner. The conveyor belt cleaner includes a scraper blade assembly that is removably mounted to a cross shaft. The scraper blade assembly includes a mounting member having a base member, a first flange extending outwardly from the base member, and a second flange extending outwardly from the base member. The first and second flanges form a first slot therebetween. The base member includes a generally circular bore through which the cross shaft extends. Each end of the base member includes a pair of diametrically opposed slots which are adapted to receive a fastener which removably connects the mounting member to the cross shaft for conjoint rotation with the cross shaft. The scraper blade assembly also includes one or more scraper blades. Each scraper blade has a mounting base and a scraping tip attached to the mounting base. The mounting base includes a bore through which the base member of the mounting member extends. The mounting base also includes a third flange and a second slot and a third slot located on opposite sides of the third flange. The third flange is adapted to be inserted into the first slot of the mounting member to form a first interlocking connection therebetween. The second slot is adapted to receive the first flange of the mounting member to form a second interlocking connection therebetween, and the third slot is adapted to receive the second flange of the mounting member to form a third interlocking connection therebetween. The interlocking connections prevent rotation of the scraper blade with respect to the mounting member.

The conveyor belt cleaner tensioner includes a mounting bracket and a tensioning rod rotatably attached to the mounting bracket. A support arm includes a first end rotatably attached to the tensioning rod and a second end. A pivot arm has a first end pivotally attached to the first end of the support arm for pivotal movement about a pivot axis and a second end adapted to receive the cross shaft. A biasing member is located between the support arm and the pivot arm to resiliently pivot the pivot arm about the pivot axis with respect to the support arm. A fastener extends between the support arm and pivot arm to allow pivotal movement of the pivot arm toward the support arm but to prevent pivotal movement of the pivot arm away from the support arm beyond a predetermined limit. Selective rotation of the tensioning rod about its central axis moves the support bracket and pivot arm along the tensioning rod until the scraper blades engage the conveyor belt. Thereafter continued rotation of the tensioning rod compresses the biasing member such that the biasing member resiliently biases the scraper blades into engagement with the conveyor belt.

BRIEF DESCRIPTION OF THE DRAWING FIGURES

FIG. 1 is a perspective view of the conveyor belt cleaner of the present invention.

FIG. 2 is a front elevational view of the conveyor belt cleaner.

FIG. 3 is a cross-sectional view of the conveyor belt cleaner taken along line 3—3 of FIG. 2.

FIG. 4 is a front elevational view of the mounting member of the conveyor belt cleaner.

FIG. 5 is an end view of the mounting member taken along line 5—5 of FIG. 4.

FIG. 6 is a perspective view of a scraper blade of the conveyor belt cleaner.

FIG. 7 is a partial front elevational view of the mounting member and of the scraper blade.

FIG. 8 is a side elevational view taken along line 8—8 of FIG. 7.

FIG. 9 is an enlarged partial side-elevational view of the scraper blade.

FIG. 10 is a side elevational view of the conveyor belt cleaner tensioner of the present invention.

FIG. 11 is a top plan view of the conveyor belt cleaner tensioner.

FIG. 12 is a front elevational view of the conveyor belt cleaner tensioner.

FIG. 13 is a side elevational view of the conveyor belt cleaner tensioner taken along line 13—13 of FIG. 12.

FIG. 14 is a side elevational view of the support arm of the conveyor belt cleaner tensioner.

DETAILED DESCRIPTION OF THE PREFERRED EMBODIMENT

The conveyor belt cleaner and tensioner assembly 20 of the present invention includes a conveyor belt cleaner 22 as shown in FIG. 1 and a conveyor belt cleaner tensioner 24 as shown in FIGS. 10–13. As best shown in FIGS. 1–3, the conveyor belt cleaner 22 includes a cross shaft 26 and a scraper blade assembly 28 that is removably mounted to the cross shaft 26. The cross shaft 26 preferably comprises an elongate generally circular tube having a hollow bore. The cross shaft 26 extends between a first end 30 and a second end 32 and includes a longitudinal central axis 34. A first pin 36 is attached to the cross shaft 26 and extends generally diametrically through the cross shaft 26 such that each end of the first pin 36 projects outwardly from the cross shaft 26. A second pin 38 extends generally diametrically tough opposing apertures in the cross shaft 26. The second pin 38 is spaced apart from and generally parallel to the first pin 36. Each end of the second pin 38 extends radially outwardly from the cross shaft 26. The second pin 38 is selectively removable from the cross shaft 26. A keeper member 40 is attached to a first end of the second pin 38 and is removably attached to a second end of the second pin 38. The keeper member 40 removably secures the second pin 38 to the cross shaft 26. The second pin 38 may be selectively removed from the cross shaft 26 by disengaging the keeper member 40 from the second end of the second pin 38 and sliding the second pin 38 along its longitudinal axis outwardly and away from the cross shaft 26.

The scraper blade assembly 28 includes a mounting member 48 and one or more scraper blades 50 coupled to the mounting member 48. The mounting member 48 as best shown in FIGS. 4 and 5 includes a generally circular tube 52, having a hollow generally circular bore 54, that extends from a first end 56 to a second end 58. The tube 52 and bore 54 have a longitudinal central axis 60. The inner circular wall of the tube 52 that is formed by the bore 54 has a diameter that is slightly larger than the diameter of the outer circular surface of the cross shaft 26, such that the cross shaft 26 may be slid longitudinally through the bore 54 of the tube 52. The first end 56 of the tube 52 includes a pair of diametrically opposed open-ended slots 62. The slots 62 are aligned with one another along an axis 64 that intersects the central axis 60. The second end 58 of the tube 52 includes a pair of diametrically opposed open-ended slots 66. The slots 66 are aligned with one another along an axis 68 that intersects the central axis 60. The axes 64 and 68 are spaced apart and generally parallel to one another. The slots 62 and 66 are elongate in a direction generally parallel to the central axis 60. The slots 62 are adapted to receive the second pin 38, and the slots 66 are adapted to receive the first pin 36 of the cross shaft 26, to thereby attach the mounting member 48 to the cross shaft 26 and prevent rotation of the mounting member 48 about the coaxial central axes 34 and 60 with respect to the cross shaft 26, and to substantially prevent longitudinal movement of the mounting member 48 with respect to the cross shaft 26.

The mounting member 48 also includes a generally rectangular and elongate first flange 74 that extends outwardly from the tube 52. The first flange 74 includes a generally planar outer wall 76, a generally planar inner wall 78 that is spaced apart from and generally parallel to the outer wall 76, and a generally planar end wall 80 that extends between the outer ends of the outer wall 76 and the inner wall 78. The mounting member 48 also includes a generally rectangular and elongate second flange 82 that is spaced apart from and generally parallel to the first flange 74. The second flange 82 includes a generally planar outer wall 84, a generally planar inner wall 86 that is spaced apart from and generally parallel to the outer wall 84, and a generally planar end wall 88 that extends between the outer ends of the outer wall 84 and the inner wall 86. A bottom wall 89 extends between the inner ends of the inner wall 78 and the inner wall 86. The bottom wall 89 is located at approximately the same radius from the central axis 60 as is the outer surface of the tube 52. The inner wall 78 of the first flange 74 and the inner wall 86 of the second flange 82 are spaced apart and parallel to one another, and are generally parallel to and equally spaced on opposite sides of a plane 90 that extends through and along the central axis 60. The end walls 80 and 88 are generally coplanar with one another. The first flange 74 and the second flange 82 extend from the first end 56 of the tube 52 to the second end 58 of the tube 52. The mounting member 48 also includes an elongate generally rectangular slot 92. The slot 92 is formed between the inner wall 78 of the first flange 74, the inner wall 86 of the second flange 82 and the bottom wall 89. The slot 92 is open at the top between the end walls 80 and 88 and is open at the first end 56 and at the second end 58 of the tube 52. The first and second flanges 74 and 82 are integrally formed with the tube 52. The mounting member 48 is preferably made from a metal, such as aluminum, but may be made from other materials if desired. The mounting member 48 is preferably formed as an extrusion.

Each scraper blade 50 of the scraper blade assembly 28, as best shown in FIGS. 6–9, includes a mounting base 100 and a scraping tip 102. As best shown in FIG. 9, the mounting base 100 includes a generally circular and annular wall 104 having a generally circular bore 106 that extends through the mounting base 100. The bore 106 includes a longitudinal central axis 108. The inner diameter of the annular wall 104 is approximately equal to the diameter of the outer surface of the tube 52 of the mounting member 48. The mounting base 100 also includes an elongate and generally rectangular first slot 110 that is in communication with the bore 106. The first slot 110 includes a generally planar outer wall 112, a generally planar inner wall 114 that is spaced apart from and generally parallel to the outer wall 112, and an end wall 116 that extends between the outer ends of the outer wall 112 and the inner wall 114. The mounting base 100 also includes an elongate and generally rectangular second slot 118 that is in communication with the bore 106 and that is spaced apart from and generally parallel to the first slot 110. The second slot 118 includes a generally planar outer wall 120, a generally planar inner wall 122 that is spaced apart from and generally parallel to the outer wall 120, and an end wall 124 that extends between the outer ends of the outer wall 120 and the inner wall 122. The mounting base 100 also includes an elongate generally rectangular flange 128 formed between the first and second slots 110 and 118. The flange 128 includes the inner walls 114 and 122 and an end wall 130 that extends between the inner ends of the inner walls 1 14 and 122. The mounting base 100 extends between a first side wall 134 and a second side wall 136. The second side wall 136 includes four outwardly extending spacer knobs 138 that are spaced equally around the central axis 108.

The first flange 74 of the mounting member 48 is adapted to fit closely within the first slot 1 10 of the mounting base 100. The second flange 82 of the mounting member 48 is adapted to fit closely within the second slot 118 of the mounting base 100. The flange 128 of the mounting base 100 of the scraper blade 50 is adapted to fit closely within the slot 92 of the mounting member 48. As best shown in FIG. 8, the first flange 74 and the first slot 110 form a first interlocking tongue and groove connection, the second flange 82 and the second slot 118 form a second interlocking tongue and groove connection, and the flange 128 and the slot 92 form a third interlocking tongue and groove connection, between the mounting member 48 and the mounting base 100 of the scraper blade 50. The interlocking tongue and groove connections respectively formed by the flanges 74, 82 and 128 and by the slots 110, 118 and 92 rotatably connect the mounting base 100 of the scraper blade 50 to the mounting member 48 such that the scraper blade 50 is conjointly rotatable with the mounting member 48 about the coaxial axes 60 and 108 and will not rotate with respect to the mounting member 48 about the axes 60 and 108. However, the tongue and groove connections formed by the flanges and slots allow the scraper blade 50 to be slid longitudinally along the mounting member 48 in a direction parallel to the axis 60.

As best shown in FIG. 8, the scraping tip 102 of the scraper blade 50 is integrally formed with and attached to the mounting base 100. The scraping tip 102 extends outwardly from the mounting base 100 to a scraping edge 144 that is adapted to engage the surface of a rotating conveyor belt. The scraping tip 102 includes a generally rectangular wear-resistant scraping element 146 that is preferably formed from a metal such as tungsten carbide. The scraping element 146 includes a generally planar top wall 148, a spaced apart and generally parallel planar bottom wall 150, a planar front wall 152 that extends between the top wall 148 and the bottom wall 150, and a planar rear wall 154 that extends between the top wall 148 and bottom wall 150 and that is generally parallel to the front wall 152. The scraping edge 144 is formed at the intersection of the top wall 148 and the front wall 152. As best shown in FIG. 8, the front wall 152 of the scraping element 146 is spaced apart from and generally parallel with a plane 158 that extends through and along the axis 108. Alternatively, the front wall 152 can be coplanar with the plane 158. The inner and outer walls 112, 114, 120, and 122 of the slots 110 and 118 are preferably set at an angle of approximately two degrees in a counter-clockwise direction to the plane 158 as best shown in FIG. 8. A generally U-shaped anchor 156 is attached to the scraping element 146 and is embedded within the scraping tip 102 to secure the scraping element 146 to the scraping tip 102.

The scraping tip 102 includes a generally convex curved front wall 160 that extends from the bottom edge of the front wall 152 of the scraping element 146 to the mounting base 100. The front wall 160 is preferably formed as an arc of a circle having a radius R1 of approximately 27.41 inches. The origin of the radius R1, in an X-Y rectangular coordinate system with the central axis 108 being at X=0 and Y=0, is approximately located at X=24.83 inches and Y=−6.90 inches.

The scraping tip 102 also includes a rear wall 162 that extends from the rear edge of the top wall 148 of the scraping element 146 to the mounting base 100. The rear wall 162 includes a generally concave curved surface 164 that extends from the mounting base 100 to a linear edge 166. The concave surface 164 is preferably formed as an arc of a circle having a radius R2 equal to approximately 6.0 inches wherein the origin of the radius R2 has X-Y coordinates with respect to the central axis 108 of X=6.95 inches and Y=3.17 inches. The rear wall 162 also includes a generally planar first surface 168 that extends from the edge 166 to a linear edge 170. The rear wall 162 also includes a generally planar second surface 172 that extends from the edge 170 to the rear edge of the top wall 148 of the scraping element 146. The second planar surface 172 is disposed at an angle of approximately 40° relative to the top wall 148 of the scraping element 146 which is generally perpendicular to the plane 158. The first planar surface 168 is disposed at an angle of approximately 30° to the second planar surface 172 and at an angle of approximately 70° relative to the top wall 148 of the scraping element 146. The scraping tip 102 includes a first side wall 176 that is generally coplanar with the first side wall 134 of the mounting base 100 and a second side wall 178 that is generally coplanar with the second side wall 136 of the mounting base 100. The mounting base 100 and the scraping tip 102 of the scraper blade 50, other than the scraping element 146 and anchor 156, is preferably made from a resilient elastomeric material such as urethane having a diameter of approximately 86 to 94 Shore A.

As best shown in FIGS. 1 and 2, the scraper blade assembly 28 includes a plurality of scraper blades 50, each including a scraping element 146. At each end of the scraper blade assembly 28 is shown a scraper blade 50' that is formed in the same shape and manner as the scraper blades 50, but which does not include the scraping element 146, anchor 156 or the knobs 138. The rectangular area occupied by the scraping element 146 in the scraper blade 50 is replaced with an elastomeric material in the scraper blade 50'. The scraping tip of the scraper blade 50' is therefore made entirely of an elastomeric material to avoid damaging the conveyor belt due to belt cupping. The mounting base 100 of the scraper blade 50 is provided with the spacer knobs 138 as the elastomeric material that forms the mounting base 100 shrinks along the axis 108 to a greater extent than does the elastomeric material that forms the outer end of the scraping tip 102 as the scraping element 146 resists shrinkage by the elastomeric material at the outer end of the scraping tip 102. As the scraping tip 102 of the scraper blade 50' does not include a scraping element 146, the scraper blade 50' shrinks generally uniformly along the axis 108 and thus does not need the spacer knobs 138 to accommodate a difference in shrinkage.

Each end 30 and 32 of the cross shaft 26 of the conveyor belt cleaner 22 is adapted to be removably mounted to a respective conveyor belt cleaner tensioner 24. As best shown in FIG. 12, the conveyor belt cleaner tensioner 24 includes a mounting bracket 202 that is adapted to be attached to a stationary structure such as a conveyor chute or the like. The mounting bracket 202 includes a vertical member 204 having a plurality of apertures 206 that are adapted to receive threaded fasteners for attaching the mounting bracket 202 to the stationary structure. The mounting bracket 202 also includes a top leg 208 that extends outwardly from the top end of the vertical member 204 at a generally right angle to the vertical member 204, and a bottom leg 210 that extends outwardly at a generally right angle to the vertical member 204 at the bottom end of the vertical member 204. The top leg 208 and the bottom leg 210 are spaced apart and generally parallel to one another and are generally horizontal. The top leg 208 includes a generally square aperture 212. The bottom leg 210 includes a generally circular aperture 214. A pair of braces 216 are attached to and extend between the bottom leg 210 and the vertical member 204.

The tensioner 24 includes a bottom bushing 220. The bottom bushing 220, as best shown in FIG. 10, includes a generally circular and annular disc 222 and a generally circular and annular sleeve 224 attached to and extending outwardly from the disc 222. A generally circular bore extends through the disc 222 and sleeve 224. The sleeve 224 is adapted to fit closely within the aperture 214 of the bottom leg 210 of the mounting bracket 202, and the disc 222 is adapted to be seated on the top surface of the bottom leg 210. The bottom bushing 220 is preferably formed from a metal such as bronze.

The tensioner 24 also includes a top bushing 228. The top bushing 228 includes a generally circular and annular disc 230 and an annular sleeve 232 attached to and extending outwardly from the disc 230. The sleeve 232 includes a generally square outer peripheral wall. A generally circular bore 234 extends through the disc 230 and sleeve 232. The square sleeve 232 is located in the square aperture 212 in the top leg 208 of the mounting bracket 202 and the disc 230 is seated on the top surface of the top leg 208. Each of the four side walls of the square sleeve 232 includes an aperture 236, such that the apertures 236 are spaced at ninety degree angles to one another. Each aperture 236 is preferably an elongated slot that is elongated in the vertical direction. The top bushing 228 is non-rotatable within the square aperture 212 of the mounting bracket 202. The top bushing 228 is preferably made from metal such as aluminum.

The tensioner 24 includes an elongate tensioning rod 240. The tensioning rod 240 includes a longitudinal central axis 242. The tensioning rod 240 includes a threaded shank 244 having a first end 246 and a second end 248. A bore 250 extends transversely and diametrically through the threaded shank 244 adjacent the first end 246 generally perpendicular to the central axis 242. The second end 248 of the shank 244 is connected to a circular first disc 252 having a first diameter. The first disc 252 is attached to a generally circular second disc 254 having a second diameter that is shorter than the first diameter of the first disc 252. A hexagonal head 256 is attached to the second disc 254. The shank 244, discs 252 and 254, and the hexagonal head 256, are aligned coaxially along the central axis 242.

The second disc 254 is located in the bore of the bottom bushing 220 such that the second disc 254 is located within the sleeve 224 and such that the first disc 252 is seated on the top surface of the disc 222. The hexagonal head 256 projects downwardly beyond the bottom leg 210. The first end 246 of the shank 244 is located within the bore 234 of the top bushing 228 such that the bore 250 in the shank 244 is adapted to selectively align with the apertures 236 of the top bushing 228. The tensioning rod 240 is adapted to be selectively rotated in either direction about the central axis 242 with respect to the bottom bushing 220, the top bushing 228 and the mounting bracket 202. A locking member 260 includes a pin 262 and a keeper member 264. The pin 262 is adapted to be removably inserted through two diametrically opposed apertures 236 in the top bushing 228 and through the bore 250 of the shank 244 to thereby couple the tensioning rod 240 to the top bushing 228. The pin 262 and the top bushing 228 thereby prevent inadvertent rotation of the tensioning rod 240 about the central axis 242. The keeper member 264 is attached at one end of the pin 262 and is removably attached to the opposite end of the pin 262 to prevent the pin 262 from being inadvertently removed from the tensioning rod 240.

The tensioner 24 includes a support arm 270 that is threadably attached to the threaded shank 244 of the tensioning rod 240. As best shown in FIG. 14, the support arm 270 includes a generally square recess 272 located in the top surface of the support arm 270 and a generally circular recess 274 located in the bottom surface of the support arm 270. A threaded bore 276 extends between the square recess 272 and the circular recess 274. The square recess 272, circular recess 274 and threaded bore 276 are aligned along a central axis 278. The threads of the threaded bore 276 are adapted to matingly engage the threads of the shank 244 of the tensioning rod 240. As shown in FIG. 10, the shank 244 extends through the square recess 272, circular recess 274, and threaded bore 276 of the support arm 270.

The support arm 270 also includes a transverse bore 280 located adjacent the top surface and rear surface of the support arm 270. The central axis of the transverse bore 280 extends generally transversely to the central axis 278. The support arm 270 also includes a leg 282 that extends outwardly from the bottom of the support arm 270. The leg 282 includes a generally circular recess 284 formed in the top surface of the leg 282 and a generally circular bore 286 that extends from the circular recess 284 to the bottom surface of the leg 282. The circular recess 284 and the circular bore 286 are respectively concentrically located about a central axis 288. The central axis 288 is spaced apart from and generally parallel to the central axis 278. A grease fitting 290 is attached to the rear surface of the support arm 270 and is in communication with the threaded bore 276.

A seal 292, preferably formed from an elastomeric material such as urethane, is located within the square recess 272 of the support arm 270. The seal 292 includes a generally square peripheral wall such that the seal 292 fits closely within the square recess 272. The seal 292 includes a threaded bore 294. The threaded bore 294 is located concentrically about the central axis 278 and is adapted to matingly engage the threads of the shank 244 of the tensioning rod 240. The seal 292 prevents debris from entering the threaded bore 276 of the support arm 270.

The tensioner 24 includes a pivot arm 300 that is pivotally attached to the support arm 270. The pivot arm includes a first side wall 302 and a spaced apart generally parallel second side wall 304. A top wall 306 extends from the top of the first side wall 302 to the top of the second side wall 304 such that the pivot arm 300 has a generally inverted U-shaped cross section. Each side wall 302 and 304 includes a rearwardly extending rear leg 308 and a forwardly extending front leg 310. Each rear leg 308 includes a generally circular aperture 312. The apertures 312 of the rear legs 308 are aligned with one another and are adapted to align with the transverse bore 280 of the support arm 270. A pivot pin 314 extends through the apertures 312 and the transverse bore 280 of the support arm 270 to pivotally attach the pivot arm 300 to the support arm 270 for pivotal movement about the pivot axis 316.

The top wall 306 of the pivot arm 300 includes an aperture 320. The aperture 320 is aligned with the central axis 288 and the bore 286 in the leg 282 of the support arm 270. A fastener 322, such as a threaded bolt, extends through the aperture 320 in the pivot arm 300 and through the bore 286 in the support arm 270. The fastener 322 includes a head at one end which engages the top wall 306 of the pivot arm 300 and a nut at a second end which engages the leg 282 of the support arm 270. A resilient helical spring 324 extends concentrically about the fastener 322 and includes a top end that engages the inside surface of the top wall 306 of the pivot arm 300 and a bottom end that is located within the circular recess 284 in the leg 282 of the support arm 270. The spring 324 is thereby located concentrically about the central axis 288. The spring 324 resiliently biases the pivot arm 300 about the axis 316 in a counterclockwise direction as shown in FIG. 10 away from the leg 282 of the support arm 270. A preferred spring 324 is a die spring manufactured by Danly as Part No. 9-2410-21 and having an outer diameter of one and one-half inches, a length of two and one-half inches, and a spring rate of 735 pounds per inch. An elastomeric tubular sleeve 326 extends around the fastener 322 and within the helical spring 324 to separate the spring 324 from the fastener 322 to thereby reduce noise from any vibration of the fastener 322. The fastener 322 prevents pivotal movement of the pivot arm 300 in a direction away from the leg 282 of the support arm 270 beyond a predetermined limit whereupon the fastener 322 engages the top wall 306 of the pivot arm 300 and the leg 282 of the support arm 270. The fastener 322 allows the pivot arm 300 to pivot about the pivot axis 316 in a direction toward the leg 282 of the support arm 270 while compressing the spring 324.

Each front leg 310 of the pivot arm 300 includes an aperture 330. The apertures 330 are aligned with one another along an axis 332. Each front leg 310 also includes a generally concavely curved circular seat 334 adapted to receive an end of the cross shaft 26 of the conveyor belt cleaner 22. The shape of the seat 334 is configured to conform closely to the outer surface of the cross shaft 26. The pivot arm 300 includes a lug 336 having an aperture 338. The lug 336 extends generally vertically upwardly from the forward end of the top wall 306 of the pivot arm 300.

The tensioner 24 includes a clamp member 350. The clamp member 350 includes a curved strap 352 that is shaped to closely conform to the outer surface of the cross shaft 26. A generally tubular sleeve 354 is attached to one end of the curved strap 352 and a generally planar lug 356 is attached to the opposite end of the sleeve 354. A pin 358 extends through the apertures 330 in the front legs 310 of the pivot arm 300 and through the bore of the tubular sleeve 354 of the clamp member 350 to thereby pivotally connect the clamp member 350 to the pivot arm 300. The clamp member 350 is pivotal with respect to the pivot arm 300 about the axis 332. The lug 356 of the clamp member 350 includes an aperture 360 that is adapted to align with the aperture 338 of the lug 336 of the pivot arm 300. A fastener 362, such as a threaded bolt, extends through the aperture 360 of the clamp member 350 and through the aperture 338 of the lug 336 of the pivot arm 300. The fastener 362 includes a threadably attached lock nut 364. Tightening of the fastener 362 draws the lug 356 and the strap 352 toward the lug 336 of the pivot arm 300 and thereby tightens and clamps the strap 352 around the cross shaft 26. A set screw 366 is threadably attached to the strap 352 and is adapted to extend through an aperture 368 in the strap 352 to selectively engage the cross shaft 26. The set screw 366 may be threadably attached to the strap 352 by a nut 370 that is attached to the strap 352 by welding or the like.

In operation, the first end 30 of the cross shaft 26 is slid through the bore 54 of the mounting member 48 of the scraper blade assembly 28 until the first pin 36 of the cross shaft 26 is seated within the slots 66 at the second end 58 of the mounting member 48. The first pin 38 is then inserted through the slots 62 at the first end 56 of the mounting member 48 and through the cross shaft 26. The keeper member 40 is then secured to each end of the first pin 36. The scraper blade assembly 28 is thereby attached to the cross shaft 26.

A conveyor belt cleaner tensioner 24 is located on each side of the conveyor belt and is attached to a stationary structure. Each conveyor belt cleaner tensioner 24 is positioned to properly locate the conveyor belt cleaner 22 with respect to the conveyor belt The first end 30 of the cross shaft 26 is positioned on the seat 334 of the pivot arm 300 of a first conveyor belt cleaner tensioner 24 and the second end 32 of the cross shaft 26 is positioned on the seat 334 of a pivot arm 300 of a second conveyor belt cleaner tensioner 24. As the operation of each conveyor belt cleaner tensioner 24 is the same, the operation of only one conveyor belt cleaner tensioner 24 will be described.

Once the cross shaft 26 is seated on the leg 310 of the pivot arm 300, the clamp member 350 is pivoted about the axis 332 such that the strap 352 engages the cross shaft 26. The fastener 362 is then inserted through the apertures 338 and 368 of the lugs 336 and 356. The conveyor belt cleaner 22 is then rotated about the axis 34 to position the scraper blades 50 at a desired scraping angle with respect to the conveyor belt. The lock nut 364 is then tightened to draw the lug 356 and strap 352 toward the lug 336. The clamping member 350 thereby clamps the cross shaft 26 to the pivot arm 300. The set screw 366 may then be tightened to engage the cross shaft 26. The clamping engagement of the cross shaft 26 by the clamp member 350 and by the set screw 366 prevents rotation of the cross shaft 26 and of the scraper blade assembly 28 about the axis 34 with respect to the pivot arm 300.

The locking member 260 is then removed from the top bushing 228 and the tensioning rod 240. A wrench or other mechanical implement may then be attached to the hexagonal head 256 of the tensioning rod 240 to provide selective rotation of the tensioning rod 240 about the axis 242. The tensioning rod 240 is rotated about the axis 242 such that the threads of the shank 244 linearly raise the support arm 270, the pivot arm 300, and the conveyor belt cleaner 22. Once the scraper blades 50 engage the conveyor belt, continued rotation of the tensioning rod 240 will compress the spring 324 and will pivot the pivot arm 300 with respect to the support arm 270 about the pivot axis 316. Once the spring 324 has been compressed a desired amount, such that the spring 324 resiliently biases the scraper blades 50 into engagement with the conveyor belt with a desired amount of force, the tensioning rod 240 is rotated to align the bore 250 with a pair of diametrically opposed apertures 236 in the top bushing 228. The pin 262 of the locking member 260 is then inserted through the apertures 236 and through the bore 250 to thereby lock the tensioning rod 240 to the top bushing 228 and prevent inadvertent rotation of the tensioning rod 240 about the axis 242.

As the scraping edges 144 of the scraper blades 50 wear down through scraping engagement with the rotating conveyor belt, the spring 324 will pivot the pivot arm 300 and the conveyor belt cleaner 22 about the axis 316 to maintain the scraper blades 50 in continuing biased scraping engagement with the conveyor belt. In addition, when the scraper blades 50 engage an obstruction such as a conveyor belt splice or the like, the spring 324 will compress to allow the conveyor belt cleaner 22 and the pivot arm 300 to pivot about the axis 316 away from the conveyor belt and allow the obstruction to pass. Thereafter the spring 324 will resiliently pivot the pivot arm 300 and the conveyor belt cleaner 22 about the axis 316 such that the scraper blades 50 will re-engage the conveyor belt. Rotation of the tensioning rod 240 moves the conveyor belt cleaner 22 in a generally linear direction to thereby tension the scraper blades 50 of the conveyor belt cleaner 22 in engagement with the conveyor belt, while allowing pivotal movement of the scraper blades about the axis 316 to provide shock relief.

When the scraper blades 50 have become worn and require replacement, the locking member 260 is removed from the top bushing 228 and the tensioning rod 240. The tensioning rod 240 is then rotated about the axis 242 in the required direction to linearly lower the support arm 270, pivot arm 300, and conveyor belt cleaner 22 away from the conveyor belt. The set screw 366 is then loosened and the fastener 362 is removed such that the clamp member 350 can be pivoted away from the cross shaft 26. The conveyor belt cleaner 22 may then be removed from the conveyor belt cleaner tensioners 24. The second pin 38 may then be removed from the cross shaft 26 and the scraper blade assembly 28 can be slid off of the cross shaft 26. A replacement scraper blade assembly 28 may be attached to the cross shaft 26 and the cross shaft 26 may then be reinstalled in the conveyor belt cleaner tensioners 24.

Various features of the invention have been particularly shown and described in connection with the illustrated embodiment of the invention, however, it must be understood that these particular arrangements merely illustrate, and that the invention is to be given its fullest interpretation within the terms of the appended claims.

What is claimed is:

1. A scraper blade assembly for a conveyor belt cleaner including:
   a mounting member including a base member, a first flange extending outwardly from said base member, and a second flange extending outwardly from said base member, said first and second flanges forming a first slot therebetween; and
   a scraper blade including a mounting base and a scraping tip attached to said mounting base, said mounting base including a third flange, a second slot and a third slot, said second and third slots being located on opposite sides of said third flange, said third flange adapted to be inserted into said first slot of said mounting member to form a first interlocking connection therebetween, said second slot adapted to receive said first flange of said mounting member to form a second interlocking connection therebetween, said third slot adapted to receive said second flange of said mounting member to form a third interlocking connection therebetween;
   whereby said interlocking connections rotatably connect said scraper blade to said mounting member.

2. The scraper blade assembly of claim 1 wherein said base member of said mounting member comprises an elongate tube having a first end and a second end.

3. The scraper blade assembly of claim 2 wherein said first end of said tube includes a first slot and said second end of said tube includes a second slot.

4. The scraper blade assembly of claim 1 wherein said first flange includes a first inner wall and said second flange includes a second inner wall, said first and second inner walls being spaced apart and generally parallel to one another, said first slot being located between said first and second inner walls.

5. The scraper blade assembly of claim 1 wherein said mounting base of said scraper blade includes a bore in communication with said second and third slots, said bore adapted to receive said base member of said mounting member.

6. The scraper blade assembly of claim 5 wherein said third flange of said mounting base of said scraper blade extends inwardly toward said bore of said mounting base.

7. A scraper blade adapted to be mounted on a mounting member of a conveyor belt cleaner including:
   a mounting base having a bore, a first slot and a second slot extending outwardly from said bore, and a flange formed between said first and second slots; and
   a scraping tip attached to said mounting base;
   whereby said bore and said first and second slots are adapted to receive the mounting member such that said mounting base is rotatably attached to the mounting member.

8. The scraper blade of claim 7 wherein said bore of said mounting base is generally cylindrical.

9. The scraper blade of claim 7 wherein said first and second slots of said mounting base extend generally parallel to one another.

10. A tensioner for a conveyor belt cleaner having a cross shaft and one or more scraper blades, said tensioner including:
    a tensioning rod having a central axis, said tensioning rod being selectively rotatable about said central axis;
    a support arm having a first end and a second end, said first end of said support arm being rotatably attached to said tensioning rod;
    a pivot arm having a first end and a second end, said first end of said pivot arm being pivotally attached to said first end of said support arm for pivotal movement about a pivot axis, said second end of said pivot arm adapted to receive the cross shaft; and
    a biasing member located between said support arm and said pivot arm adapted to resiliently pivot said pivot arm about said pivot axis with respect to said support arm;
    whereby selective rotation of said tensioning rod about said central axis moves said support bracket and said pivot arm along said tensioning rod until the scraper blades engage a conveyor belt, and continued rotation of the tensioning rod compresses said biasing member such that said biasing member resiliently biases the scraper blades into engagement with the conveyor belt.

11. The tensioner of claim 10 wherein said tensioning rod comprises a threaded rod.

12. The tensioner of claim 10 including a locking member adapted to selectively prevent rotation of said tensioning rod.

13. The tensioner of claim 10 wherein said biasing member comprises a spring.

14. The tensioner of claim 10 including a fastener extending between said support arm and said pivot arm, said fastener allowing pivotal movement of said pivot arm toward said support arm and preventing pivotal movement of said pivot arm away from said support arm beyond a predetermined limit.

15. The tensioner of claim 14 wherein said fastener extends through said biasing member.

16. The tensioner of claim 10 wherein said pivot arm includes a clamp member pivotally attached to said second end of said pivot arm, said clamp member adapted to clamp the cross shaft to said pivot arm.

* * * * *